(No Model.)

J. W. MIX.
METHOD OF MENDING PUNCTURES IN PNEUMATIC TIRES.

No. 553,562. Patented Jan. 28, 1896.

Witnesses:
N. M. Ward
E. Bekel

Inventor:
Judd W. Mix
By A. O. Behel
Attys.

United States Patent Office.

JUDD W. MIX, OF BYRON, ILLINOIS.

METHOD OF MENDING PUNCTURES IN PNEUMATIC TIRES.

SPECIFICATION forming part of Letters Patent No. 553,562, dated January 28, 1896.

Application filed July 8, 1895. Serial No. 555,184. (No specimens.)

*To all whom it may concern:*

Be it known that I, JUDD W. MIX, a citizen of the United States, residing at Byron, in the county of Ogle and State of Illinois, have invented a new and useful Method of Mending Punctures in Pneumatic Tires, of which the following is a specification.

The object of this invention is to mend punctures in pneumatic tires by the insertion of a patch of sheet-rubber in its folded condition wholly within the tire, through the puncture, and causing it to adhere first along its folded portion and flattening out covering the puncture.

Figure 1:
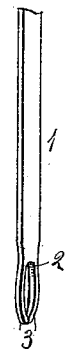
Figure 2:
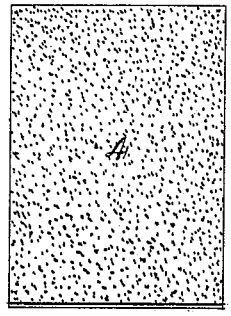
Figure 3:
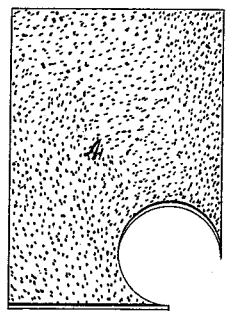
Figure 4:
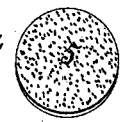
Figure 5:
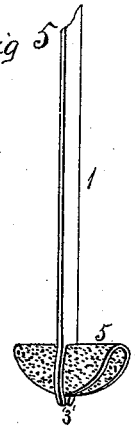
Figure 6:
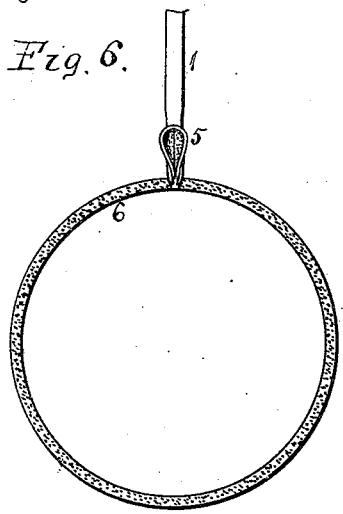
Figure 7:
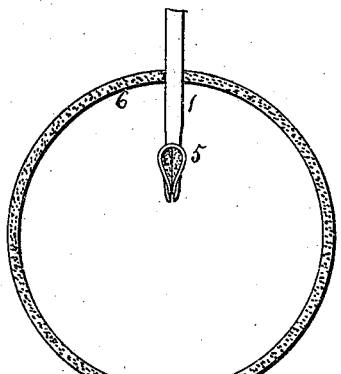
Figure 9:
Figure 8:
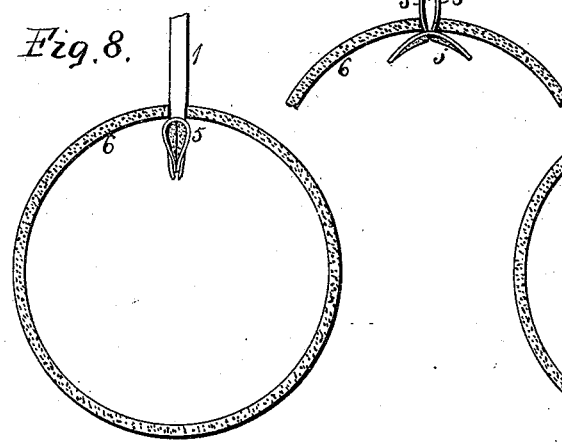
Figure 10:

In the accompanying drawings, Figure 1 is an isometrical representation of the instrument for placing the patch in position. Fig. 2 is an isometrical representation of a section of sheet-rubber. Fig. 3 is an isometrical representation of the section of sheet-rubber from which a patch has been cut. Fig. 4 is an isometrical representation of a patch. Fig. 5 is an isometrical representation of the instrument and patch held thereby. Fig. 6 is a transverse view of the tire and the instrument about to force the patch through the tire. Fig. 7 is a transverse view of the tire and the patch wholly within the tire. Fig. 8 is a transverse view of the tire in which the patch is brought in contact with the inner face of the tire. Fig. 9 is a transverse view of the tire in which the patch has practically unfolded and the instrument partially withdrawn. Fig. 10 is a transverse view of the tire in which the patch is in position on the inner face of the tire over the puncture and the instrument withdrawn.

In the employment of pneumatic tires consisting of a single tube the only manner of closing a puncture has been by the employment of plugs having a flanged head and a long tapering shank. The head is forced through the opening in the tire, allowing its flanged head to expand, which is drawn up against the inner face of the tire and held in place by cement previously applied to the head, after which the shank is cut off flush with the outer surface of the tire. This process required that the opening in the tire be considerably enlarged by cutting away the material composing the tire, and it has been found that the plug would become detached and creep inward, requiring a larger plug to again close the opening.

My improved method is designed to place a section of sheet-rubber without a shank or other attachment through the puncture and causing it to adhere to the inner face of the tire over the puncture, and in the drawings I have shown an instrument for carrying out my method.

The instrument is shown at Fig. 1 and consists of a shank portion 1, having one end provided with an eye 2, the walls 3 forming spring-jaws.

From a sheet of rubber 4 is cut a patch 5, in this instance of circular form. The patch is folded so that the fold will be on the central line, as near as may be. The patch is placed in its folded condition in the eye of the instrument, so that its folded edge will be at the closed end of the eye, as shown at Fig. 5. Either the outer surface of the patch is covered with adhesive liquid or the inner surface of the tubing 6 may be coated with the adhesive, or both may be thus treated, the object being to insure adhesion between the surfaces. The patch is then forced into the puncture, as shown at Fig. 6, until it is wholly within the tire, as shown at Fig. 7, when it will assume its normal condition within the tire. The instrument is partially withdrawn, carrying the folded edge of the patch against the inner surface of the tire, causing it to adhere along its folded edge, as shown at Fig. 8. The instrument is then partially withdrawn, allowing the patch to unfold, as shown at Fig. 9, and when free of the patch the patch will straighten out and its entire surface adhere to the inner surface of the tire, as shown at Fig. 10. If deemed necessary, the patch may be pressed more firmly into position.

As before stated, I am aware that plugs have been employed to close the punctures in pneumatic tires, and in some instances a head of flexible sheet-rubber having a shank by which the head is brought in proper position over the opening; but so far as I am aware I am the first to employ a piece of rubber without attachment of any kind and which is wholly within the tire.

I claim as my invention—

The method of closing a puncture in pneumatic tires, consisting in folding a section of sheet rubber with one fold, forcing it in its folded condition and with the edges in advance through the puncture in the tire until wholly within the tire, and while in its folded condition causing its folded edge to come in contact with the inner surface of the tire across the puncture and adhere thereto by reason of liquid adhesive having been previously applied, and finally allowing it to unfold and cover the puncture.

JUDD W. MIX.

Witnesses:
   A. O. BEHEL,
   E. BEHEL.